(12) United States Patent
Matsumoto et al.

(10) Patent No.: US 8,730,377 B2
(45) Date of Patent: May 20, 2014

(54) IMAGING APPARATUS ADJUSTING AUTOFOCUS POSITION BASED ON STORED ADJUSTMENT AMOUNT

(75) Inventors: Yusuke Matsumoto, Osaka (JP); Norikazu Yamamoto, Kyoto (JP)

(73) Assignee: Panasonic Corporation, Osaka (JP)

( * ) Notice: Subject to any disclaimer, the term of this patent is extended or adjusted under 35 U.S.C. 154(b) by 163 days.

(21) Appl. No.: 12/837,586

(22) Filed: Jul. 16, 2010

(65) Prior Publication Data

US 2011/0019067 A1    Jan. 27, 2011

(30) Foreign Application Priority Data

Jul. 27, 2009  (JP) ................................. 2009-174062
Jun. 23, 2010  (JP) ................................. 2010-143004

(51) Int. Cl.
*H04N 5/232*    (2006.01)

(52) U.S. Cl.
USPC ......................................................... 348/346

(58) Field of Classification Search
USPC ......... 348/360, 346, 345, 348, 349, 354, 355, 348/340, 240.99, 240.3, 240, 99; 396/103, 396/121, 222
See application file for complete search history.

(56) References Cited

U.S. PATENT DOCUMENTS

| | | | | |
|---|---|---|---|---|
| 5,281,796 A | * | 1/1994 | Kaneda et al. | 250/201.2 |
| 5,877,811 A | * | 3/1999 | Iijima et al. | 348/375 |
| 7,945,152 B2 | * | 5/2011 | Hirai et al. | 396/123 |
| 8,106,995 B2 | * | 1/2012 | Tamaru | 348/345 |
| 2006/0061678 A1 | * | 3/2006 | Yamazaki | 348/349 |
| 2009/0047010 A1 | * | 2/2009 | Yoshida et al. | 396/127 |

FOREIGN PATENT DOCUMENTS

| | | | |
|---|---|---|---|
| JP | 10232343 A | * | 9/1998 |
| JP | 10232434 A | * | 9/1998 |
| JP | 2004-333924 | | 11/2004 |
| JP | 2005-176102 | | 6/2005 |
| JP | 2006-295774 | | 10/2006 |
| JP | 2007-166155 | | 6/2007 |
| JP | 2008-263486 | | 10/2008 |
| JP | 2008-283605 | | 11/2008 |
| JP | 2009-273034 | | 11/2009 |

* cited by examiner

*Primary Examiner* — Ahmed A Berhan

(74) *Attorney, Agent, or Firm* — Panasonic Patent Center

(57) ABSTRACT

The imaging apparatus includes an optical system including a focus lens operable to adjusts a focus state of a subject image, an imaging unit operable to capture a subject image obtained through the optical system to generate image data, a controller operable to obtain a plurality of image data generated in the imaging unit while moving the focus lens along an optical axis, a display unit operable to display an image based on the plurality of generated image data; a receiving unit operable to receive an instruction of a user for selecting one of the plurality of images displayed on the display unit, a storage unit operable to store information on a focus lens position at which the image data selected by the receiving unit is captured; and an autofocus control.

6 Claims, 10 Drawing Sheets

IMAGING APPARATUS ADJUSTING AUTOFOCUS POSITION BASED ON STORED ADJUSTMENT AMOUNT

BACKGROUND ART

1. Technical Field

The technical field relates to an imaging apparatus capable of adjusting a focus lens position.

2. Related Art

Conventionally, there is known a technique for focus bracketing in which pictures are serially taken with sequential changes in focus position. For example, JP-A-2008-263486 discloses an imaging apparatus capable of selecting an image focused on a region desired by a user out of a plurality of images focus-bracketed at a plurality of focus positions, and recording the selected image.

In the apparatus described in above-mentioned JP-A-2008-263486, to obtain an image at a focus position desired by the user, the user needs to perform focus bracketing and subsequently select an image every time of photographing, and hence the apparatus is not easy to use.

Further, there may be a case where a focus position which is settled when the imaging apparatus performs the autofocus operation (hereinafter, referred to an autofocused position) is displaced due to a dimensional error, an arrangement error or the like of an optical system constituting the imaging apparatus. In such a case, when the technique described in JP-A-2008-263486 is intended to be used for eliminating the displacement, the above operation needs to be performed every time of photographing, making the operation complex, and hence such a use is unrealistic.

To solve the above problems, an imaging apparatus provided, which is capable of reproducing with ease a focus position desired by the user and eliminating a displacement of an autofocused position which has occurred due to a manufacturing error of the imaging apparatus, or the like.

SUMMARY

In a first aspect, an imaging apparatus is provided, which includes an optical system including a focus lens operable to adjusts a focus state of a subject image, an imaging unit operable to capture a subject image obtained through the optical system to generate image data, a controller operable to obtain a plurality of image data generated in the imaging unit while moving the focus lens along an optical axis, a display unit operable to display an image based on the plurality of generated image data; an receiving unit operable to receive an instruction of a user for selecting one of the plurality of images displayed on the display unit, a storage unit operable to store information on a focus lens position at which the image data selected by the receiving unit is captured; and an autofocus control adjustment unit for adjusting autofocus control in accordance with the stored information on the focus lens position.

In a second aspect, an imaging apparatus including a camera body and an interchangeable lens is provided. The interchangeable lens includes, an optical system including a focus lens for adjusting a focus state of a subject image, and a storage unit operable to store identification information to specify the interchangeable lens, the camera body includes an imaging unit operable to capture a subject image obtained through the optical lens to generate image data, a controller operable to obtain a plurality of image data generated in the imaging unit while moving the focus lens along an optical axis; a display unit operable to display an image based on the plurality of generated image data, an receiving unit operable to receive an instruction of a user for selecting one of the plurality of images displayed on the display unit, a storage unit operable to store information on a focus lens position at which the image data selected by the receiving unit is captured, and the identification information of the interchangeable lens, and an autofocus control adjustment unit operable to adjust autofocus control in accordance with the stored information on the focus lens position, and the identification information on the interchangeable lens.

According to the above aspect, autofocus control is adjusted in accordance with information on a focus lens position at which an image data selected by the user out of a plurality of image data which were captured while the focus lens was moved along the optical axis. In that case, the information on the focus lens position is stored into the imaging apparatus. Therefore, just by the user performing the selection operation once, it is possible from then on to reproduce with ease the focus position desired by the user and eliminate a displacement of the autofocused position which occurs due to a manufacturing error of the imaging apparatus, or the like.

BRIEF DESCRIPTION OF DRAWINGS

FIG. 7 is a flowchart of a control operation for focus fine adjustment in photographing or the like.

DETAIL DESCRIPTION OF PREFERRED EMBODIMENT

First Embodiment

A digital camera according to a first embodiment will be described below. The digital camera according to the first embodiment is configured to finely adjust with ease a focus position desired by the user. In the following, a configuration and an operation of the digital camera according to the first embodiment will be described with reference to the drawings.

1. Configuration

Figure 1:
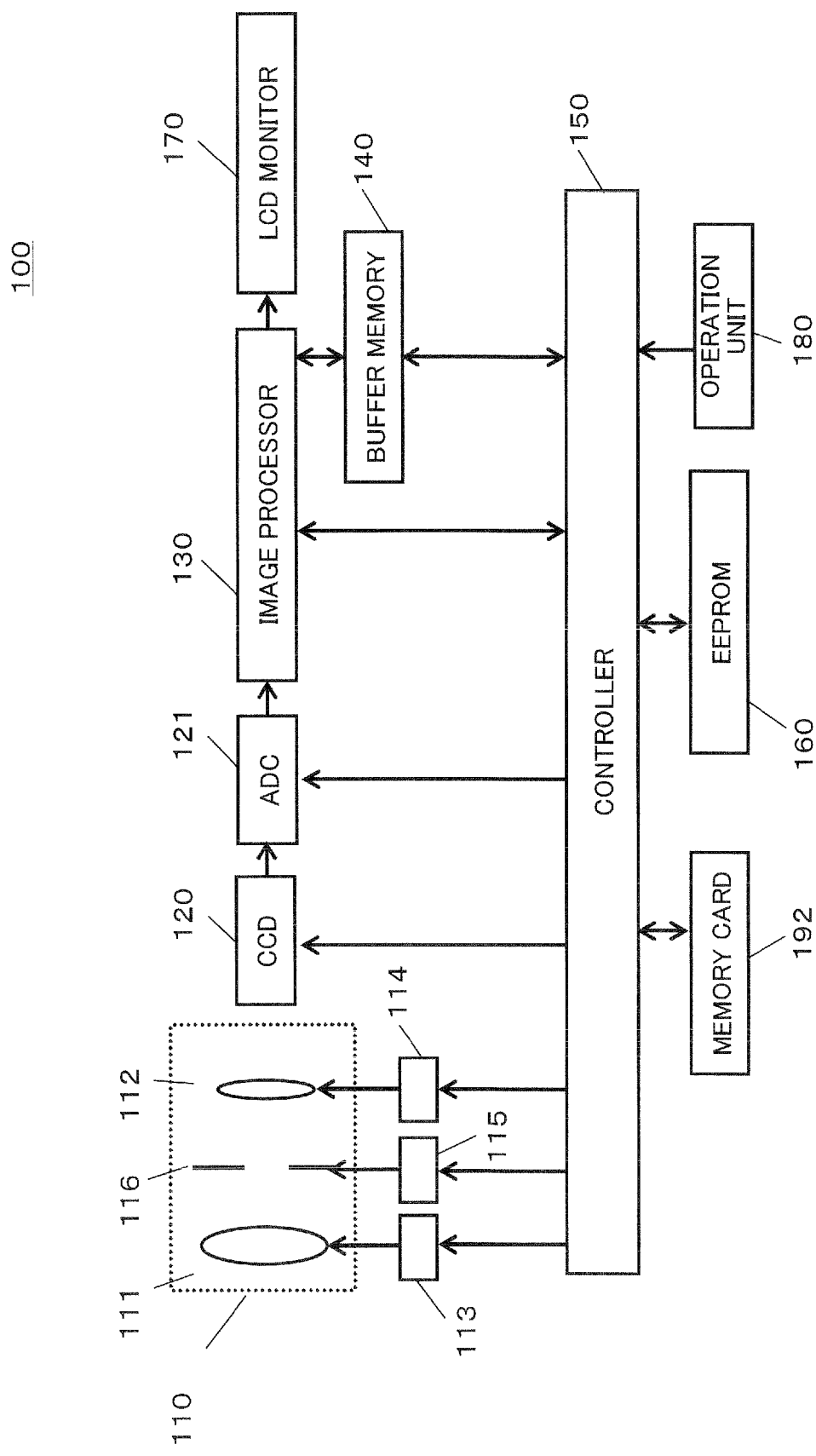
FIG. 1 is an electric constitutional diagram of a digital camera according to a first embodiment.

First, an electric configuration and a rear configuration of the digital camera according to the first embodiment will be described. FIG. 1 is an electric configuration of a digital camera 100 according to the first embodiment.

The digital camera 100 has an optical system 110, a CCD image sensor 120, an ADC (analog digital converter) 121, an image processor 130, a liquid crystal display (LCD) monitor 170, a buffer memory 140, a controller 150, an EEPROM 160, and an operation unit 180. Further, the digital camera 100 is configured to be capable of storing a memory card 192 capable of storing captured image data.

Light corrected by the optical system 110 is imaged on the CCD image sensor 120. The CCD image sensor 120 converts the imaged light into electrical charge, to generate an image signal that is an analog signal. The image signal generated by the CCD image sensor 120 is transmitted to the ADC 121. The ADC 121 converts the transmitted analog image signal into a digital signal, and transmits the signal to the image processor 130. The image processor 130 performs gamma correction, white balance correction, YC conversion processing, electron zoom processing, compression processing, decompression processing, and the like on the transmitted image data. The image data subjected to the variety of processing by the image processor 130 is stored to a memory card 192. It is to be noted that the user can select whether or not to store the image data into the memory card 192 by operating the operation unit 180. The LCD monitor 170 can display an image based on image data generated by the CCD image sensor 120 and transmitted through the ADC 121 and the image processor 130, and image data stored in the memory card.

The controller 150 controls an entire operation of the digital camera 100. The controller 150 includes a ROM for storing information such as a program, a CPU for processing information such as a program, and the like. The ROM stores a program for integrated control of the entire operation of the digital camera 100, other than a program regarding an autofocus operation.

The buffer memory 140 is storage unit that functions as work memories of the image processor 130 and the controller 150.

The optical system 110 includes a zoom lens 111, a focus lens 112 and a diaphragm 116. The zoom lens 111 enlarges/reduces a subject image. The focus lens 112 adjusts a focus state of the subject image. The diaphragm 116 adjusts an amount of light (F number) passing through the optical system 110.

The zoom motor 113 drives the zoom lens 111 in accordance with a direction from the controller 150. The focus motor 114 drives the focus lens 112 in accordance with a direction from the controller 150. The diaphragm drive motor 115 drives the diaphragm 116 in accordance with a direction from the controller 150. A DC motor, a stepping motor, a linear motor and the like are applicable to the zoom motor 113, the focus motor 114 and the diaphragm drive motor 115.

The EEPROM 160 stores information required for lens control. For example, the EEPROM 160 stores tracking curve data for driving the zoom motor 113 and the focus motor 114, and an moving amount reference table (detailed later). The tracking curve is a curve of a relation between a focus lens position and a zoom lens position which are set with respect to each subject distance. The controller 150 directs driving of the focus motor 114 and the zoom motor 113 based on the read tracking curve.

Figure 2:
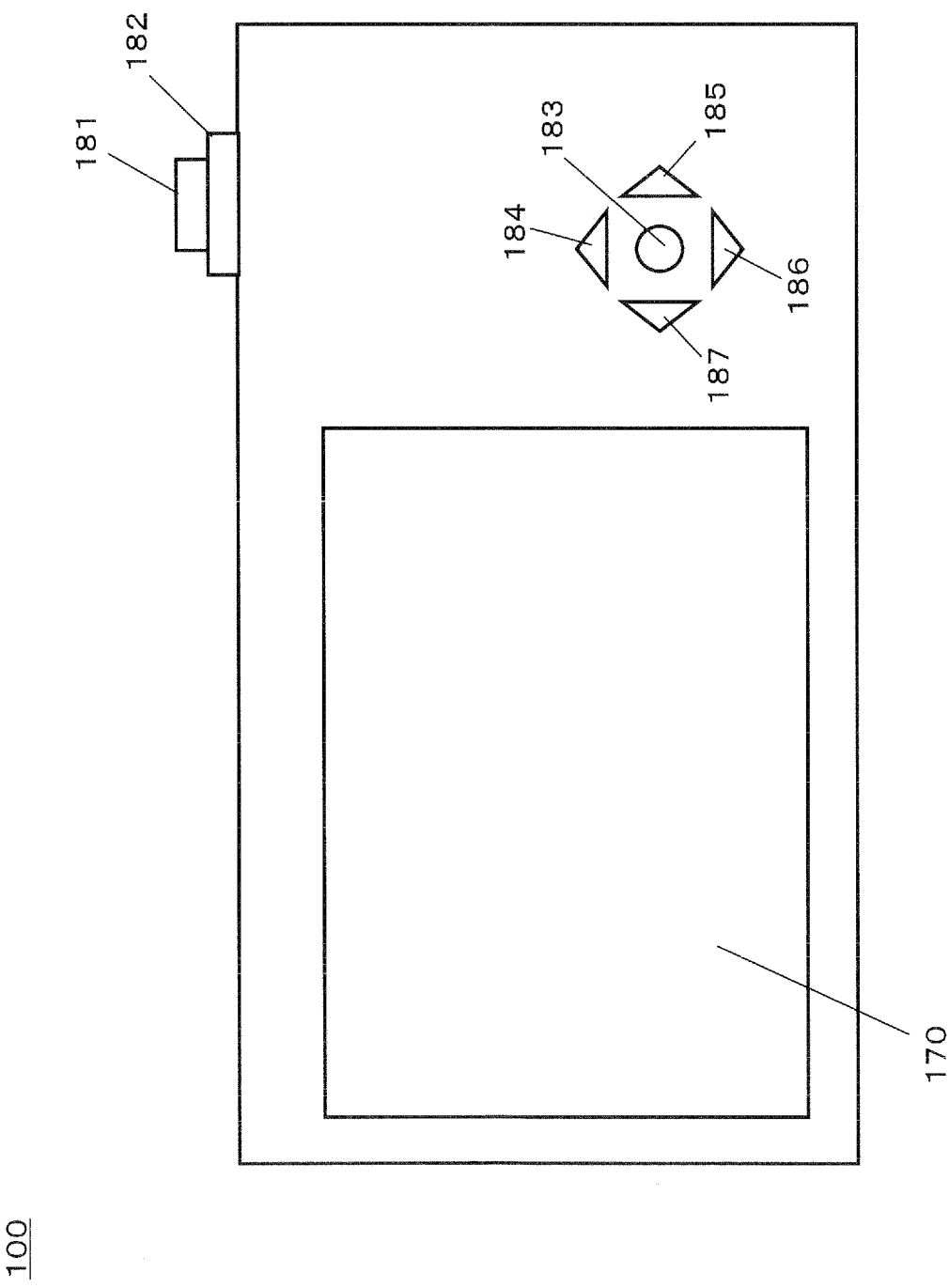
FIG. 2 is a rear view of the digital camera.

FIG. 2 is a rear view of the digital camera 100 body according to the first embodiment. On the rear surface and the upper surface of the digital camera 100 body, a zoom dial 182, a release button 181, an up key 184, a right key 185, a down key 186, a left key 187, a center button 183, a LCD monitor 170, and the like are arranged. These constitutional elements constitute the operation unit 180 of FIG. 1. The LCD monitor 170 may be a touch panel scheme.

When the zoom dial 182 is operated by the user, the controller 150 adjusts an enlargement/reduction factor to allow taking of a picture of the subject in a wide-angle or telescopic manner. Specifically, the controller 150 generates a control signal for driving the zoom motor 113 in accordance with an operation of the zoom dial 182 by the user.

The release button 181 is configured to allow two-step input including halfway pressing and fully pressing. Upon halfway-pressing of the release button 181, the controller 150 performs the autofocus control operation, and on fully-pressing of the release button 181, the controller 150 stores captured image data in the memory card 192. On pressing of the center button 183 in recording or playback of images, the controller 150 calls a menu screen regarding recording or playback of images and displays the screen on the LCD monitor 170. On the other hand, on pressing of the center button 183 to select a display item when the menu screen is on display, the controller 150 performs control regarding the selected display item.

2. Operation

Subsequently, the operation of the digital camera 100 according to the first embodiment will be described with reference to the drawings. The digital camera 100 of the present embodiment has a function of allowing the user to finely adjust the focus position in a state desired bay the user, and then to set that state. Further, when the focus position is finely adjusted by the user, the digital camera 100 can perform autofocus control to realize the finely adjusted focus position in capturing image from then on. The control will be described below with reference to flowcharts of FIGS. 3 and 7, and the like.

2.1 Setting of Focus Fine Adjustment Amount

Figure 3:
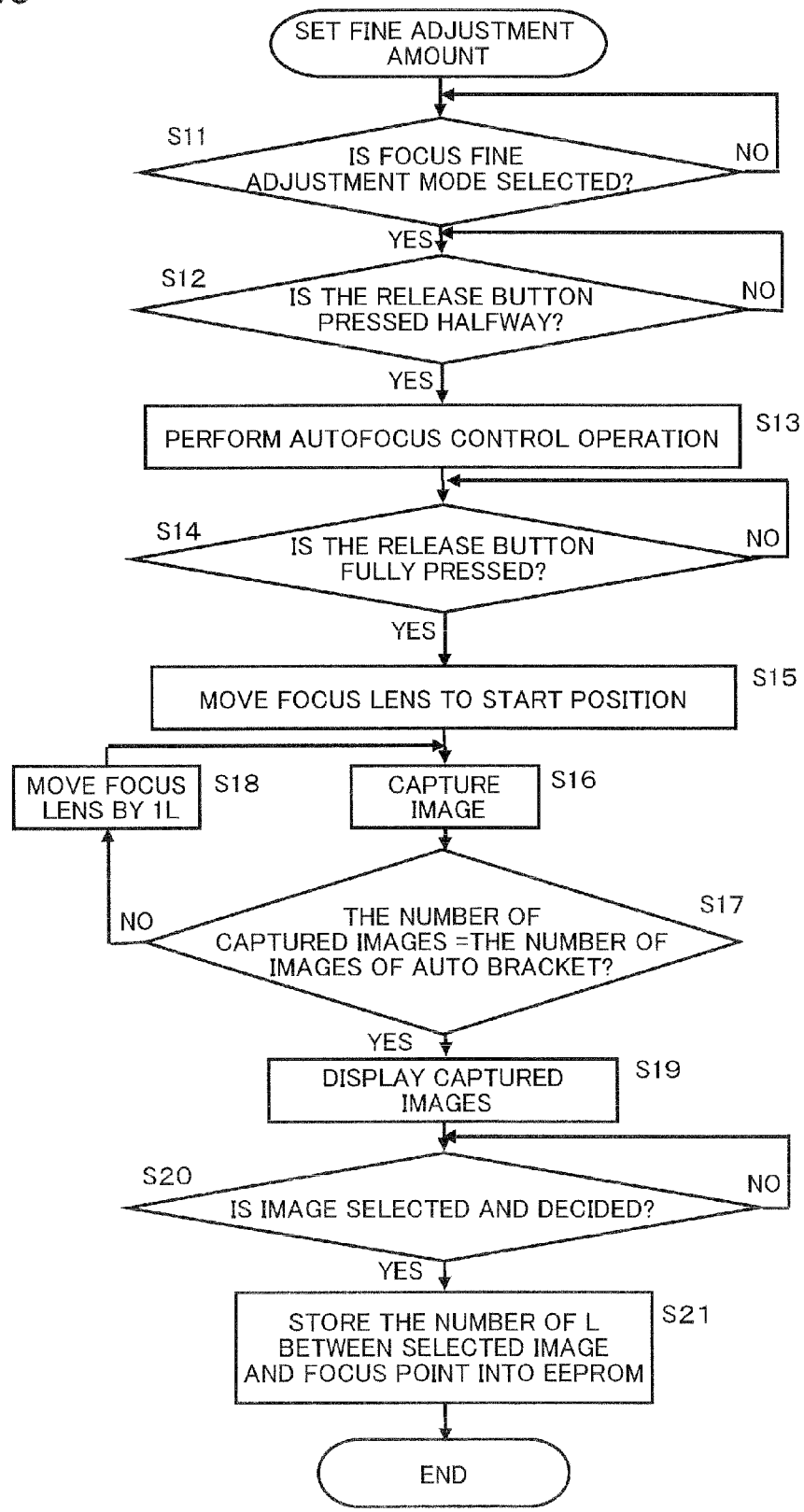
FIG. 3 is a flowchart of a control operation in a focus fine adjustment mode.
Figure 4:
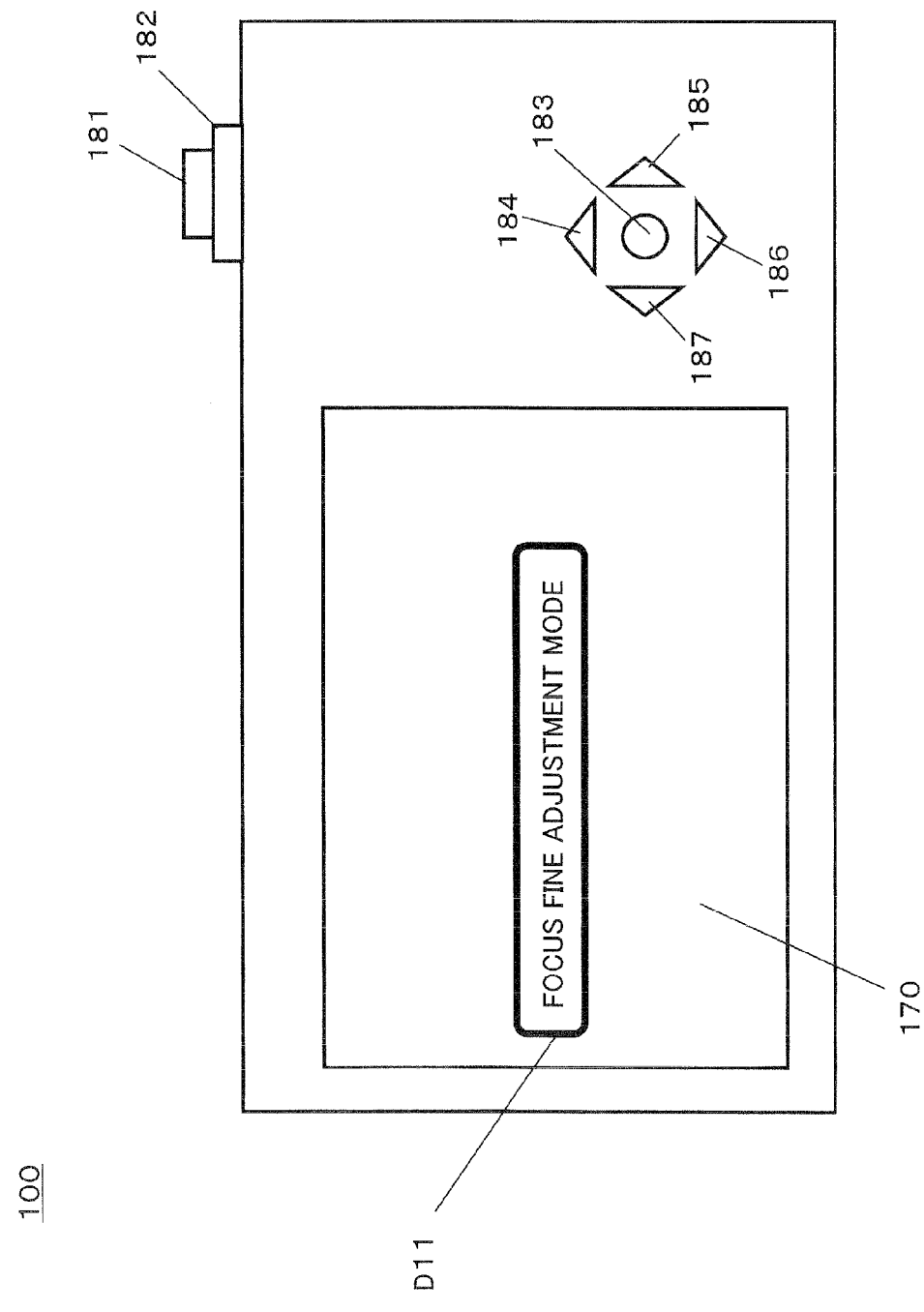
FIG. 4 is an image view of a focus fine adjustment mode selection screen.

FIG. 3 is a flowchart of an operation for setting amount of fine adjustment of focus (hereinafter, referred to "focus fine adjustment amount") of the digital camera 100. This operation is controlled by the controller 150. Upon pressing of the center button 183 by the user in a state where the digital camera 100 is on a recording mode or a playback mode, the controller 150 displays the menu screen on the LCD monitor 170. When a focus fine adjustment mode is selected by the user from the menu screen (S11), the controller 150 displays a "focus fine adjustment mode" on the LCD monitor 170 as shown in FIG. 4, and also monitors whether or not the release button 181 has been halfway pressed by the user (S12). Upon halfway pressing of the release button 181 by the user, the controller 150 performs an autofocus control operation to focus on the subject (S13). It is to be noted that the controller 150 continuously drives the diaphragm drive motor 115 to adjust an amount of light passing through the optical system 110 to optimal exposure.

Upon completion of the autofocus control operation, the controller 150 displays a sign indicating completion of focusing on the subject on the LCD monitor 170. Thereafter, on fully pressing of the release button 181 by the user (S14), the controller 150 performs setting operations for focus fine adjustment and the like.

Figure 5:
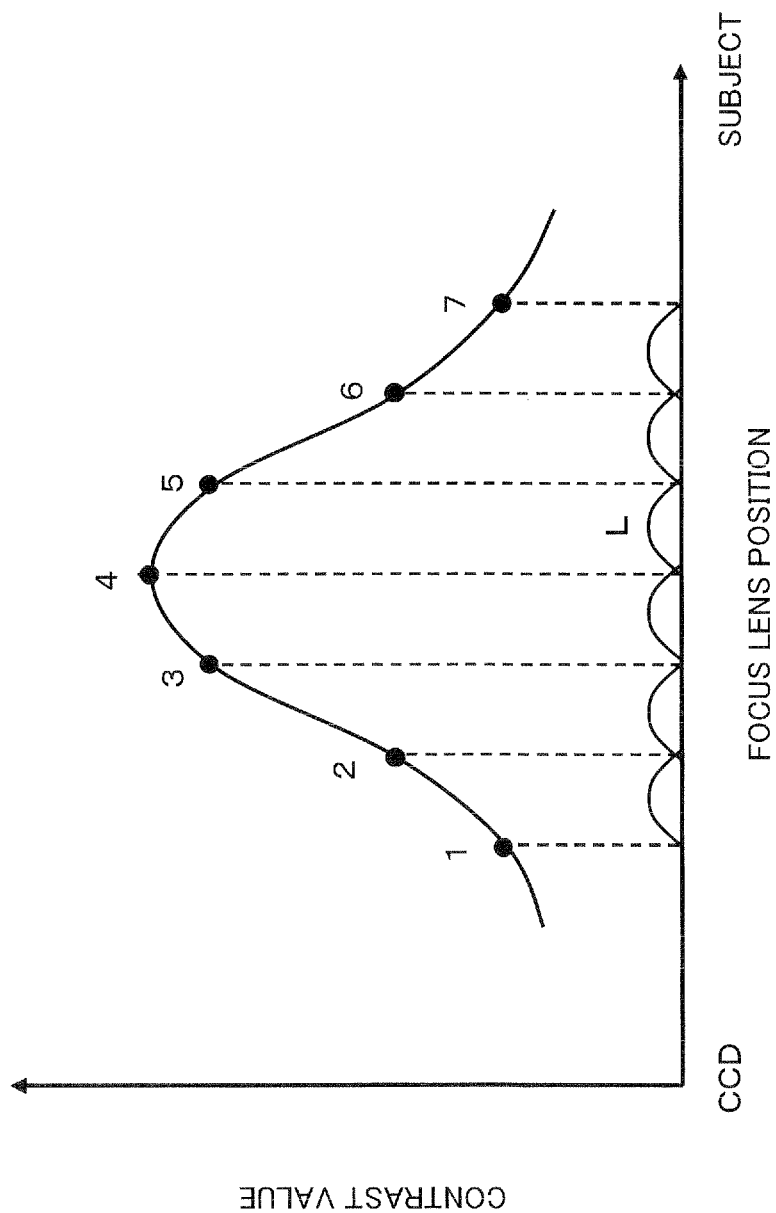
FIG. 5 is a diagram showing a change in contrast value with respect to a focus lens position.

In the following, a setting operation for a focus fine adjustment amount is described in details. FIG. 5 is a diagram showing a change in contrast value of an image captured by the CCD image sensor 120 with respect to the focus position. First, the controller 150 drives the focus motor 114 to move the focus lens 112 from the autofocused position to the CCD image sensor 120 side by m×L (S15). Here, the autofocused position is a focus position which is determined when the digital camera 100 performs the autofocus operation. Further the value m is set to 3 as an example in the present embodiment. The position of this focus lens 112 is regarded as a start position in the focus fine adjustment mode. "L" is a unit amount of moving (hereinafter, referred to "unit moving amount"), and is a moving amount of the focus lens 112 which is required for moving the focus position by an amount of Fδ at the image surface (at the autofocused position). "L" is decided uniquely based on a subject distance, a focus distance and an F number. "F" is an F number of the optical system, and "δ" is a diameter of an allowable circle of confusion. "Fδ" is an image surface moving amount which does not make a blur of an image when the focus lens 112 moves by Fδ. Specifically, "Fδ" is a product of the F number of the optical system 110 and a distance δ corresponding to a two-pixel cell size of the CCD image sensor 120. With L being set based on such Fδ, a difference in focus state between adjacent images captured in auto bracket mode can be sufficiently recognized by a general user. For example, when L is set to a smaller value than Fδ, the difference in focus state between the adjacent images becomes more difficult to grasp. In the present embodiment, L is set to Fδ, thereby not causing such a problem. On the other hand, for example when L is set to a larger value than Fδ, the focus positions of the adjacent images are significantly spaced, to increase the difference in focus state. Hence there may be a case where the user cannot obtain the focus state preferred by the user. In other words, there may occur a case where the user can be satisfied with neither of the images. However, in the present ent, since L is set based on Fδ by which a blur is not felt on the image, even when a focus position as the focus state preferred by the user exists between the adjacent images, the focus state preferred by the user is reproduced in either image. In other words, likelihoods that the user can be satisfied are higher.

L corresponding to arbitrary Fδ exists with respect to each of the subject distance, the focus distance and the F number. After completion of the move of the focus lens 112, the controller 150 captures an image of the subject with the CCD image sensor 120 (S16). The controller 150 temporarily stores the captured image data into the buffer memory 140.

The controller 150 counts the number of image data inside the buffer memory 140, the data having been captured in the focus fine adjustment operation, and determines whether or not the number has reached a predetermined number (m(above)×2+1) (S17). For example, in the present embodiment, the focus lens 112 is moved to a focus point and respective three points in the front and rear with the focus point at the center (focus point±3×unit moving amount L), to capture image data. In this example, images are captured at seven points in total. In the case of the number of image data not reaching 7, the controller 150 provides the focus motor 114 with a direction to move the focus lens 112 by one unit moving amount L in a direction toward the subject (S18). The controller 150 repeats the operations from steps S16 to S18 until the number of image data reaches 7. It is to be noted that, In the above example, although images are captured at the respective three points in the front and rear, this is not restrictive. Further, although Fδ=F number×2 pixels of the imaging device in the above example, this is not restrictive, and Fδ is arbitrarily decidable.

Figure 6:
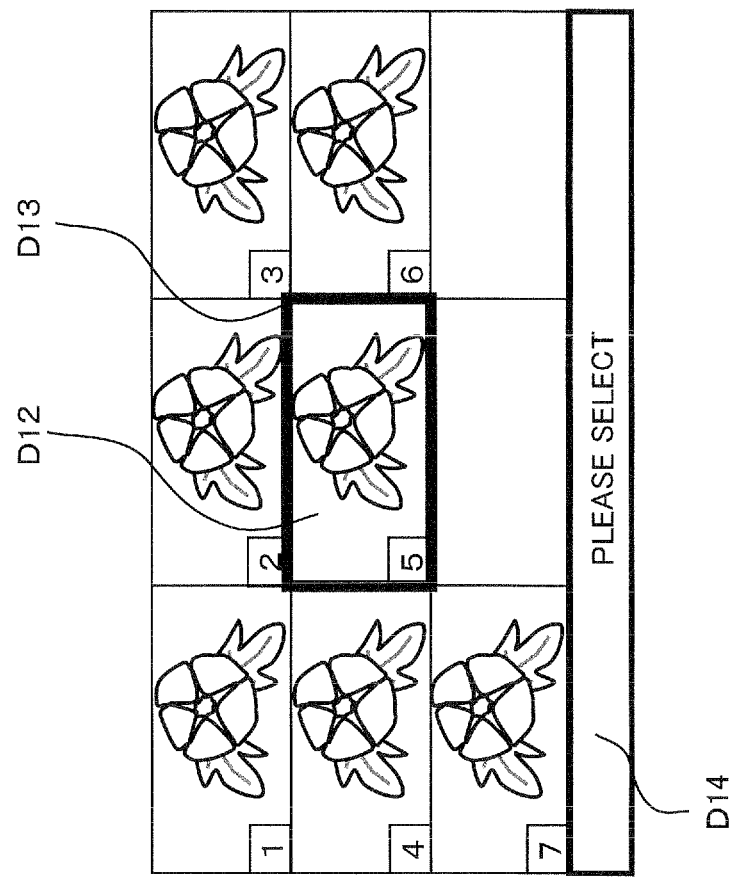
FIG. 6 is an image view of a selection screen for an image for focus fine adjustment.

When the number of image data captured by the focus fine adjustment operation reaches the predetermined number, the controller 150 displays by thumbnail images on the LCD monitor 170 based on image data stored in the buffer memory 140 (S19). Although the thumbnail image may be an entire captured image, in the present embodiment, the thumbnail image is an enlarged image of only the vicinity of the subject focused as in the image D12 of FIG. 6. This enables the user to compare each of the images captured in auto bracket mode with ease. The controller 150 makes a display D14 prompting selection of an image in the focus state preferred by the user out of the displayed thumbnail images displayed on the LCD monitor 170.

The controller 150 determines whether or not the user selects and decides the image in the focus state preferred out of the displayed thumbnail images (S20). Here, the user can select image data in the most preferred focus state by pressing the up key 184, the right key 185, the down key 186 and/or the left key 187. The controller 150 displays a select frame D13 on the LCD monitor 110 for the image being selected by the user. When the user wants to decide a selected image, the user can press the center button 183 to decide the image.

When the image is selected and decided by the operation of the user, the controller 150 compares the focus lens position of the selected and decided image with the focus lens position of the image captured at the autofocused position of the subject. The controller 150 then divides a difference (displaced amount) in position of the focus lens 112 at which the respective image data are captured, by the unit moving amount L, and stores the result in the EEPROM 160 (S21). For example, when the difference (displaced amount) in position of the focus lens 112 is n×L, a value of "n" is stored. This value of n is hereinafter referred to as a "fine adjustment amount". Specifically, the EEPROM 160 stores the fine adjustment amount n as information corresponding to the displaced amount between the focus lens position (position of numeral 4 in FIG. 5) at which the controller 150 determined that the subject was focused and the focus lens position at which an image data in the focus state desired by the user was captured. The controller 150 uses the stored fine adjustment amount n as a set value for the focus fine adjustment operation from the next time on. The focus fine adjustment operation is later described in detail.

As thus described, according to the digital camera of the first embodiment, the user can make a setting of a focus fine adjustment amount.

Further, in the digital camera according to the first embodiment, it is possible to apply the fine adjustment amount n set as described above to the time when an image of another subject is captured. In the following, the fine adjustment operation of the focus lens 112 is described.

2.2 Focus Fine Adjustment Operation.

Figure 7:
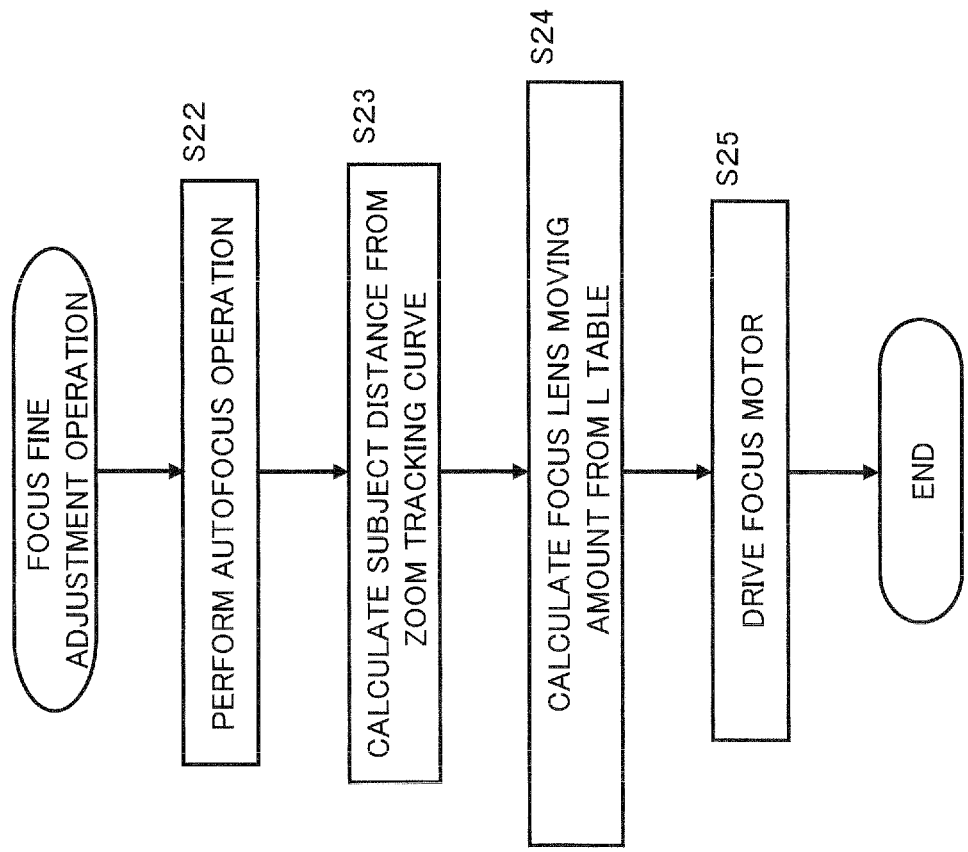

FIG. 7 is a flowchart of a control operation for focus fine adjustment. This operation is controlled by the controller 150. It is assumed that in the EEPROM 160, the fine adjustment amount n of the focus lens position was previously set by the control operation of step S21 described above.

Figure 9:
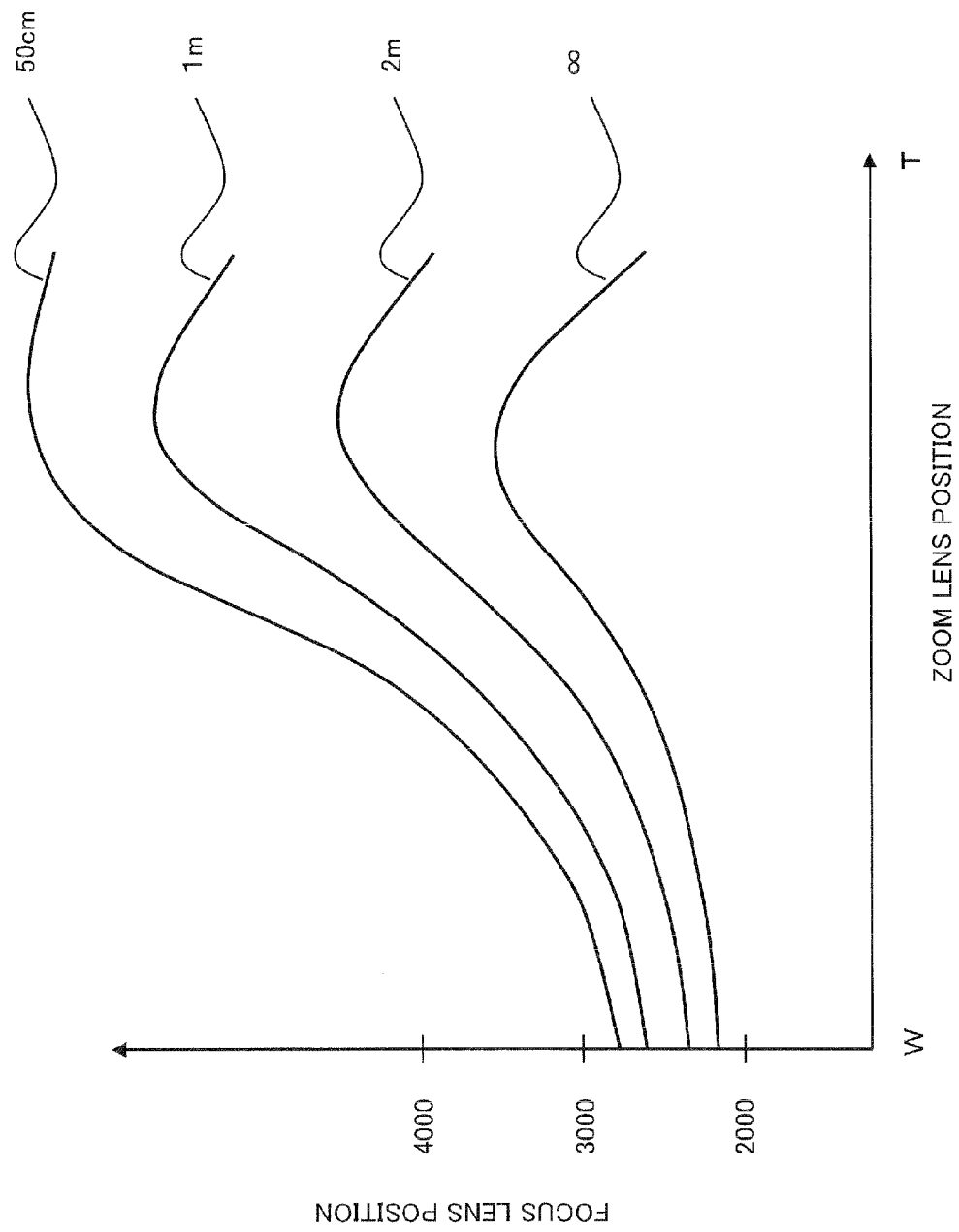
FIG. 9 is an explanatory diagram of a zoom tracking

When the digital camera 100 is in a recording mode, on halfway pressing operation of the release button 181 by the user, the controller 150 performs an autofocus control operation on the subject (S22). Subsequently, the controller 150 decides a subject distance on completion of the autofocus operation by referring to a zoom tracing curve from the positions of the zoom lens 111 and the focus lens 112 which were decided by the autofocus control operation (S23). FIG. 9 shows the zoom tracking curve. The zoom tracking curve is a diagram of the relation of the focus lens position versus the zoom lens position with respect to each subject distance. By referring to the zoom tracking curve, it is possible to uniquely decide the subject distance based on the current positions of the zoom lens 111 and the focus lens 112 of the digital camera 100.

Figure 8:
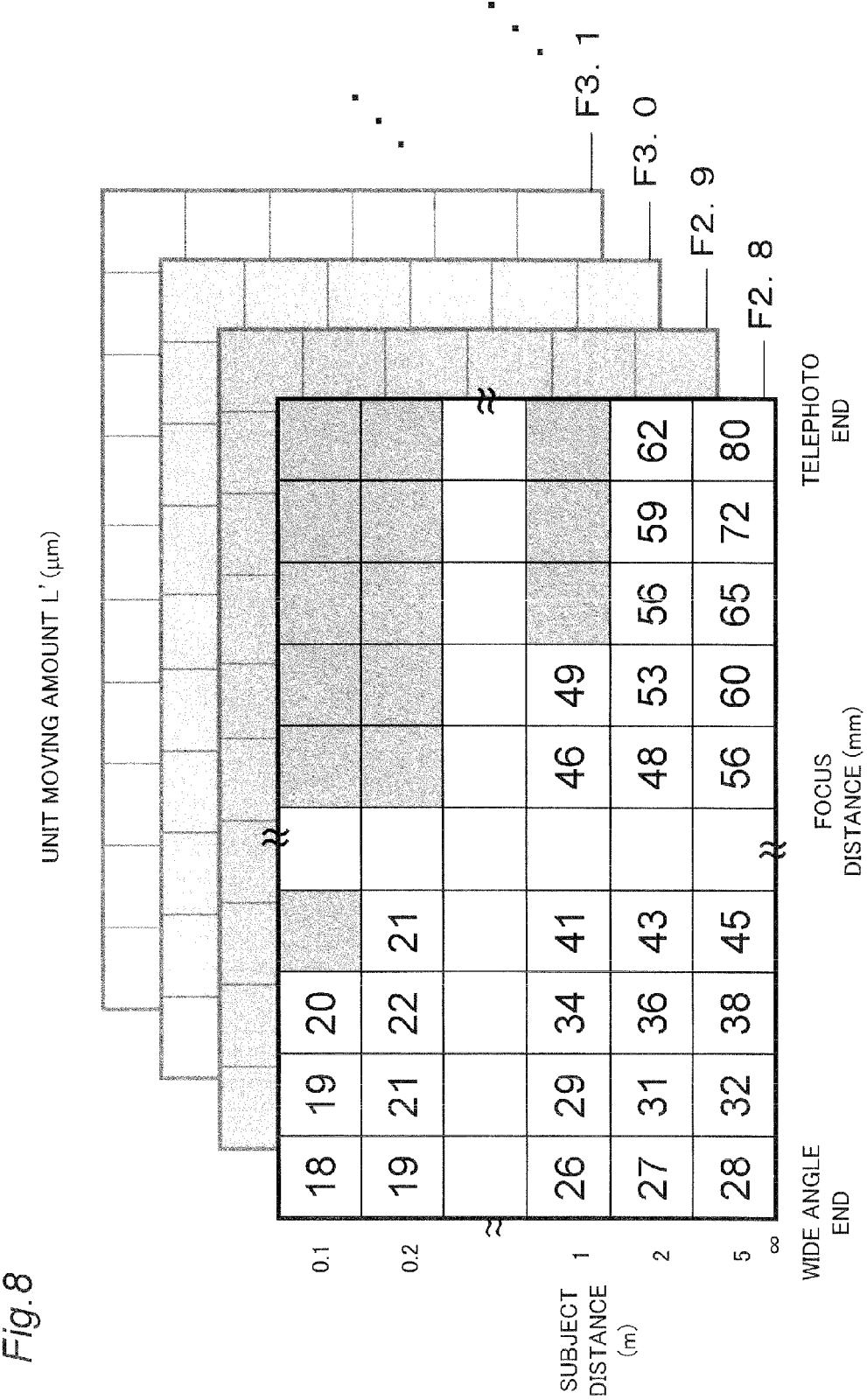
FIG. 8 is a table showing a moving amount of the focus lens with respect to a focus distance and a subject distance.

Subsequently, the controller 150 calculates a unit moving amount L' based on the decided subject distance, the position of the zoom lens 111 (focus distance information) and the number is value information) (S24). The unit moving amount L' is a moving amount (hereinafter referred to as L') of the focus lens for reproducing the unit moving amount L used in setting of the fine adjustment amount shown in FIG. 3 on conditions of the current zoom lens position, F number and the subject distance. In order to calculate this unit moving amount L', the controller 150 refers to a moving amount reference table shown in FIG. 8. The moving amount reference table is a table made of a value of L' decided based on the focus distance and the subject distance with respect to each F number. For example, when the subject distance is 1 m and the F number is 2.8 with a wide angle end, the value of L' is 26 μm.

The controller 150 reads the fine adjustment amount n of the focus lens position stored in step S21 of FIG. 3 from the EEPROM 160. Using this n, the focus lens moving amount is calculated. For example, when the fine adjustment amount n is +2, the controller 150 calculates 2×L' as the focus lens moving amount. The controller 150 drives the focus motor 114, to move the focus lens 112 by the focus lens moving amount from the autofocused position once set by the autofocus operation (S25).

Subsequently, on fully pressing of the release button 181 by the user, the controller 150 captures an image at the focus lens position finely adjusted by the focus lens moving amount, and stores the generated image data in the memory card 192.

As thus described, the digital camera 100 of the present embodiment is capable of reproducing a displacement of the focus lens position desired by the user with ease.

3. Summary

According to the digital camera 100 of the present embodiment, for example, even a user not having knowledge about cameras can photograph an image making good use of a blur with ease. Further, in photographing a flower or the like with a digital camera, in the case of the user wanting to attain focus in the front or back of the focus point, according to the digital camera 100 of the present embodiment, the user can visually select an image with a focus most preferred by the user out of a plurality of images photographed with the focus point at the center, so as to obtain a desired image with ease.

Further, with information on the focus state stored into the EEPROM 160A, it is possible to reproduce the same focus displacement as the image selected by the above-mentioned selection and decision operations regardless of a distance to the subject to be photographed. For example, in the case of the user preferring to a description at a position displaced by a constant distance from the focus position, only one-time selection/setting of a preferred image can realize a displacement of the same focus every time from then on without depending on the subject distance. For example in micro photographing of a flower, a pistil or a stamen which projects forward tends to be focused, but the user can set a preferred image as described above (sets the fine adjustment amount n in the digital camera 100), thereby to focus not on the pistil or the stamen but on petals. Further, on the contrary, when there is a displacement of the autofocused position due to a manufacturing error of the digital camera 100 or the like, fine adjustment can be performed by the above method, thereby to eliminate the error.

4. Correspondence Relation to Claims

The focus lens 112 is an example of the focus lens. The CCD image sensor 120 is an example of the imaging unit. The controller 150 is an example of the controller. The LCD monitor 170 is an example of the display unit. The operation unit 180 is an example of the receiving unit. The EEPROM 160 is an example of the storage unit. The focus motor 114 and the controller 150 are an example of the autofocus control adjustment unit.

Second Embodiment

Figure 10:
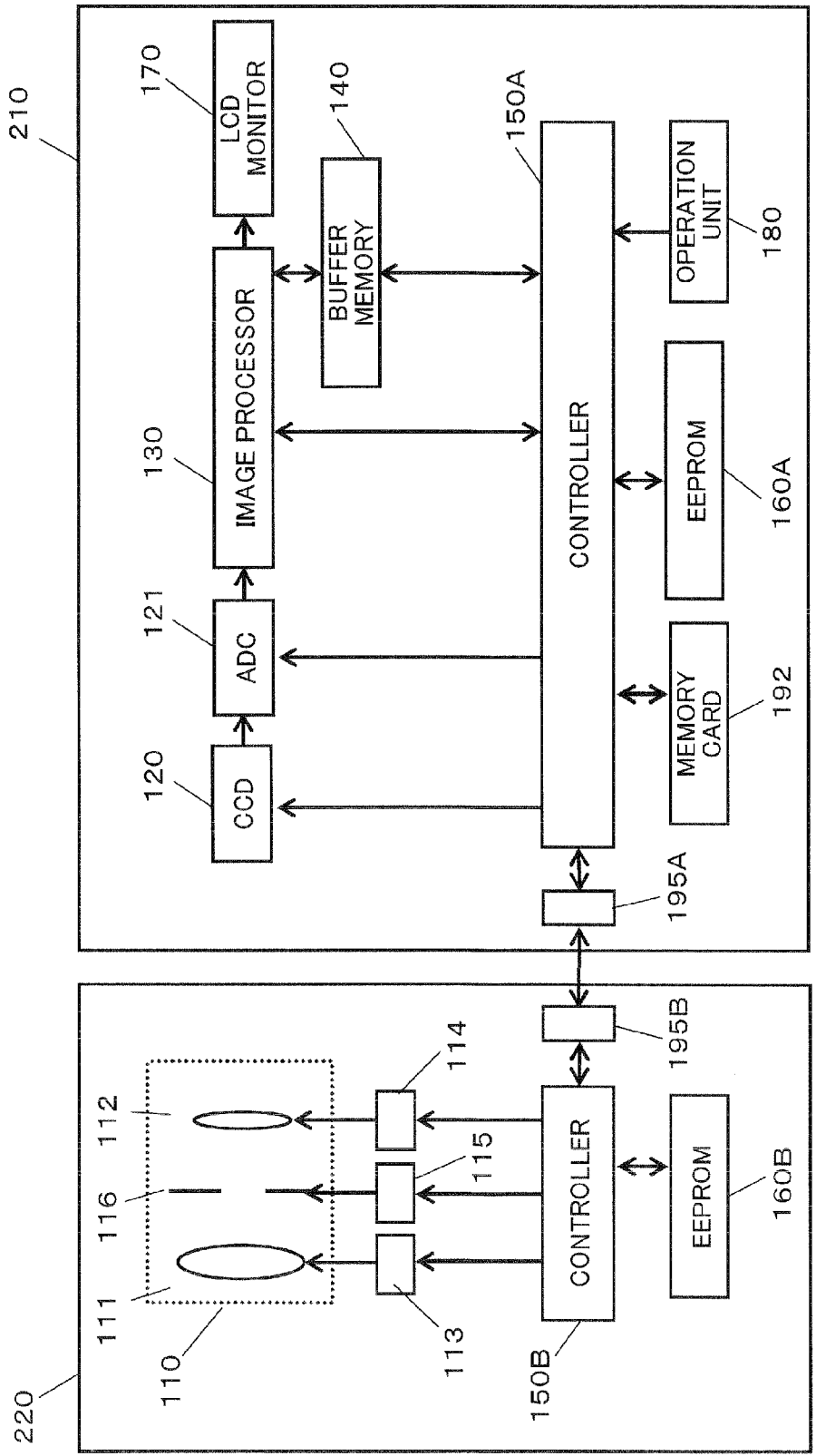
FIG. 10 is an electric constitutional diagram of a digital camera in accordance with a second embodiment.

A digital camera according to a second embodiment will be described. FIG. 10 is an electric constitutional diagram of the digital camera according to the second embodiment.

1. Configuration

The digital camera 200 according to the second embodiment is a lens interchangeable type digital camera, having a camera body 210 and an interchangeable lens 220 that is detachable from the camera body 210.

The camera body 210 has the CCD image sensor 120, the ADC (analog digital converter) 121, the image processor 130, the LCD monitor 170, the buffer memory 140, a controller 150A, an EEPROM 160A, and the operation unit 180, which are similar to those of the digital camera 100 according to the first embodiment. Further, the camera body 210 has a communication unit 195A for communicating with the interchangeable lens 220.

In addition to the optical system 110 similar to that of digital camera 100 of the first embodiment, the interchangeable lens 220 further has a controller 150B and an EEPROM 160B. Moreover, the interchangeable lens 220 has a communication unit 195B for communicating with the camera body 210.

In the EEPROM 160B, a type number, a serial number, and the like of the interchangeable lens 220 are stored.

The controller 150A of the camera body 210 and the controller 150B of the interchangeable lens 220 can mutually communicate through the communication units 195A and 195B, to transmit and receive a variety of data.

The controller 150A of the camera body 210 controls the camera body 210, and also outputs signals for drive control of the focus lens 112, the zoom lens 111 and the diaphragm 116, to the controller 150B of the Interchangeable lens 220.

The controller 150B of the interchangeable lens 220 controls drives of the focus lens 112, the zoom lens 111, and the diaphragm 116 based on the signal for drive control of the focus lens 112, the zoom lens 111 and the diaphragm 116 from the camera body 210.

Further, in the state of being attached with the interchangeable lens 220, the controller 150A of the camera body 210 communicates with the controller 150B of the interchangeable lens 220 through the communication units 195A and 195B, and obtains the type number and the serial number of the interchangeable lens 220 which are stored in the EEPROM 160B, to stores the numbers into the EEPROM 160A. This obtainment operation may be performed at an initial operation when the camera body 210 is powered on, or the like.

2. Operation

The digital camera 200 of the second embodiment operates basically in accordance with the foregoing flowcharts of FIGS. 3 and 7, but in step S21 of the flowchart of FIG. 3 and step S25 of the flowchart of FIG. 7, processing unique to the lens interchangeable type camera are performed. In the following, a description is given with a focus on this respect.

In the digital camera 200 of the second embodiment, the controller 150A of the camera body 210 separately stores the fine adjustment amount n with respect to each serial number of the interchangeable lens 220 in foregoing step S21 of the flowchart of FIG. 3. For example, the controller 150A of the camera body 210 stores the serial number of the interchangeable lens 220 correspondingly to the fine adjustment amount n inside the EEPROM 160A. In storing the fine adjustment amount n inside the EEPROM 160A, the controller 150A of the camera body 210 checks whether or not the serial number of the currently attached interchangeable lens 220 exists inside the EEPROM 160A, and when the serial number does not exist, the controller 150A newly stores the serial number of the interchangeable lens 220 correspondingly to the fine adjustment amount n. On the other hand, when the serial number exists, the controller 150A of the camera body 210 updates data of the fine adjustment amount n corresponding to that serial number. It is to be noted that in the steps other than S21 of the flowchart of FIG. 3, similar processing to those described in the first embodiment are performed.

Further, in the focus fine adjustment operation, in foregoing step S25 of the flowchart of FIG. 7, the controller 150A of the camera body 210 reads from the EEPROM 160 the fine adjustment amount n of the focus lens position stored in step S21 of FIG. 3. At this time, the controller ism reads the fine adjustment amount n of the focus lens position corresponding to the serial number of the currently attached interchangeable lens 220 based on this serial number. For example, when the fine adjustment amount n is 3, the controller 150A calculates an amount three times as large as foregoing L' as the focus lens moving amount. The controller 150A moves the focus motor 114 from the autofocused position once set in step S22 in accordance with the decided focus lens moving amount (S25).

Upon fully pressing of the release button 181 by the user, the controller 150A stores image data captured with the fine adjustment amount n set in step S21 to the memory card 192.

As thus described, according to the second embodiment, in the lens interchangeable type digital camera 200, a displacement of focus lens position desired by the user can be reproduced with ease.

Further, in the lens interchangeable type digital camera, although displacement occurs between a CCD image sensor position and an image formation position due to an individual difference of a lens size, according to the present embodiment, such displacement can be visually corrected with respect to each interchangeable lens. This can make the most of the performance of the lens optical system.

Other Embodiments

Although the contrast detection scheme is adopted as the focus scheme of autofocus in the first and second embodiments, the technical idea described in the first and second embodiments is also applicable to a phase difference detection scheme. In the contrast detection scheme, as described with reference to FIG. 5, bracketing is performed at a plurality of points while changing the focus lens position with the position of 4 with the highest contrast value taken as the center, but in the case of the application to the phase difference scheme, bracketing may be performed at a plurality of points while changing the focus lens position with a autofocused position taken as the center, the focus position having been detected by phase difference detection as having the smallest phase difference. Also in this case, the idea of the first invent is applicable in terms of L and L'.

It should be noted that, in the contrast detection scheme, the contrast detection can be performed based on image data generated by the CCD image sensor 120, whereas in the phase difference detection scheme, an additional AF sensor for phase difference detection is required. An arranged position of the AF sensor is displaced, though slightly. The camera body can be configured to allow the user to input a distance to the subject, to calculate an error between this distance and the distance detected by the AF sensor, to correct a displacement of the autofocused position associated with the displacement of the AF sensor position.

In the first and second embodiment, the CCD image sensor 120 is an example of an imaging unit. The imaging unit may be other imaging device such as CMOS image sensor, NMOS image sensor. Further, although the unit moving amount was L in setting the fine adjustment amount n in the first and second embodiments, the unit moving amount may be 1/i of L (i is an integer), such as ½L or ⅓L.

INDUSTRIAL APPLICABILITY

The above embodiments are applicable to one other than the digital camera. For example, it is applicable to any equipment so long as it captures and displays images, such as a digital movie camera and a mobile phone with a camera.

What is claimed is:

1. An imaging apparatus, comprising:
   an optical system including a focus lens operable to adjust a focus state of a subject image;
   an imaging unit operable to capture a subject image obtained through the optical system to generate image data;
   a controller operable to obtain a plurality of image data generated in the imaging unit while moving the focus lens along an optical axis from a focus position of the focus lens, which is determined by autofocus control which focuses on the subject image;
   a display unit operable to display an image based on the plurality of generated image data;
   a receiving unit operable to receive an instruction of a user for selecting one of the plurality of images displayed on the display unit;
   a storage unit operable to store an adjustment amount which is information on a displaced amount between a focus lens position at which the image data selected by the receiving unit is captured and the focus position of the focus lens determined by the autofocus control; and
   an autofocus control adjustment unit operable to adjust the focus lens position based on the stored adjustment amount from the focus position determined by the autofocus control.

2. The imaging apparatus according to claim 1, wherein the controller obtains the plurality of image data generated by the imaging unit while moving the focus lens by a predetermined amount along the optical axis, and the predetermined amount is a product of a diameter of an allowable circle of confusion and an F number associated with an amount of light passing through the optical system.

3. The imaging apparatus according to claim 1, wherein the autofocus control adjustment unit calculates a unit moving amount of the focus lens based on a zoom lens position, an F number associated with an amount of light passing through the optical system and a subject distance, calculates a focus lens moving amount based on the calculated unit moving amount of the focus lens and the information on the focus lens position, and moves the focus lens by the calculated focus lens moving amount from the position determined by the autofocus control.

4. An imaging apparatus, comprising a camera body and an interchangeable lens,
   the interchangeable lens comprising
   an optical system including a focus lens for adjusting a focus state of a subject image; and
   a storage unit operable to store identification information to specify the interchangeable lens,
   the camera body comprising:
   an imaging unit operable to capture the subject image obtained through the optical lens to generate image data;
   a controller operable to obtain a plurality of image data generated in the imaging unit while moving the focus lens along an optical axis from a focus position of the focus lens, which is determined by autofocus control which focuses on the subject image;

a display unit operable to display an image based on the plurality of generated image data;

a receiving unit operable to receive an instruction of a user for selecting one of the plurality of images displayed on the display unit;

a storage unit operable to store an adjustment amount which is information on a displaced amount between a focus lens position at which the image data selected by the receiving unit is captured and the focus position of the focus lens determined by the autofocus control, and the identification information of the interchangeable lens; and an autofocus control adjustment unit operable to adjust the focus lens position based on the stored adjustment amount from the focus position determined by the autofocus control, and the identification information on the interchangeable lens.

5. The imaging apparatus according to claim 4, wherein
the controller obtains the plurality of image data generated by the imaging unit while moving the focus lens by a predetermined amount along the optical axis, and
the predetermined amount is a product of a diameter of an allowable circle of confusion and an F number associated with an amount of light passing through the optical system.

6. The imaging apparatus according to claim 4, wherein
the autofocus control adjustment unit calculates a unit moving amount of the focus lens based on a zoom lens position, an F number associated with an amount of light passing through the optical system and a subject distance, calculates a focus lens moving amount based on the calculated unit moving amount of the focus lens and the information on the focus lens position, and moves the focus lens by the calculated focus lens moving amount from the position determined by the autofocus control.

* * * * *